US007162044B2

(12) United States Patent
Woods

(10) Patent No.: US 7,162,044 B2

(45) **Date of Patent: *Jan. 9, 2007**

(54) AUDIO SIGNAL PROCESSING

(75) Inventor: William S. Woods, Minneapolis, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 31 days.

This patent is subject to a terminal disclaimer.

(21) Appl. No.: 10/731,915

(22) Filed: Dec. 10, 2003

(65) Prior Publication Data

US 2004/0120535 A1 Jun. 24, 2004

Related U.S. Application Data

(63) Continuation of application No. 09/393,463, filed on Sep. 10, 1999.

(51) Int. Cl.
*H04B 15/00* (2006.01)

(52) U.S. Cl. .......................................... 381/93; 381/83

(58) Field of Classification Search .................. 381/66, 381/93, 96, 83
See application file for complete search history.

(56) References Cited

U.S. PATENT DOCUMENTS 3,527,901 A 9/1970 Geib
4,088,835 A * 5/1978 Thurmond et al. ........... 381/83
4,232,192 A 11/1980 Beex ........................ 179/1 FS
4,366,349 A 12/1982 Adelman .................... 179/107
4,396,806 A 8/1983 Anderson ................... 179/107
4,419,544 A 12/1983 Adelman .................... 179/107
4,471,490 A 9/1984 Bellafiore .................... 381/69
4,637,402 A 1/1987 Adelman .................... 128/746
4,783,818 A 11/1988 Graupe et al. ................ 381/71
4,882,762 A 11/1989 Waldhauer
5,016,280 A 5/1991 Engebretson et al. ......... 381/68
5,259,033 A 11/1993 Goodings et al. ............. 381/68
5,331,299 A 7/1994 Smith
5,390,254 A 2/1995 Adelman ..................... 381/68
5,402,496 A 3/1995 Soli et al. ...................... 381/94
5,434,924 A 7/1995 Jampolsky ................. 381/68.4
5,475,759 A 12/1995 Engebretson .............. 381/68.2
5,502,769 A 3/1996 Gilbertson ................... 381/68
5,506,910 A 4/1996 Miller et al.
5,553,152 A 9/1996 Newton ..................... 381/68.6
5,581,747 A 12/1996 Anderson ................... 395/551
5,659,621 A 8/1997 Newton ....................... 381/68
5,677,987 A 10/1997 Seki et al.
5,706,392 A 1/1998 Goldberg et al. .......... 395/2.19
5,717,772 A 2/1998 Lane et al.

(Continued)

FOREIGN PATENT DOCUMENTS

EP 0579252 1/1994

(Continued)

OTHER PUBLICATIONS

Griffing, Terry S., et al., "Acoustical Efficiency of Canal ITE Aids", *Audecibel*, (Spring 1983),30-31.

(Continued)

*Primary Examiner*—Vivian Chin
*Assistant Examiner*—Corey Chau
(74) *Attorney, Agent, or Firm*—Schwegman, Lundberg, Woessner & Kluth, P.A.

(57) ABSTRACT

Systems, devices, and methods are provided to inhibit at least one feedback component of an input audio signal by adjusting a feedback-inhibiting filter through a narrowband subaudible signal. The level of the signal may be determined using an audibility model so as to yield its subaudible quality.

49 Claims, 8 Drawing Sheets

U.S. PATENT DOCUMENTS

| | | | | |
|---|---|---|---|---|
| 5,757,933 | A | 5/1998 | Preves et al. | 381/68 |
| 5,822,442 | A | 10/1998 | Agnew et al. | 381/107 |
| 5,825,631 | A | 10/1998 | Prchal | 361/790 |
| 5,835,611 | A | 11/1998 | Kaiser et al. | 381/321 |
| 5,852,668 | A | 12/1998 | Ishige et al. | 381/312 |
| 5,862,238 | A | 1/1999 | Agnew et al. | 381/321 |
| 5,910,994 | A | 6/1999 | Lane et al. | 381/93 |
| 5,920,633 | A | 7/1999 | Yang | |
| 6,041,129 | A | 3/2000 | Adelman | 381/328 |
| 6,072,884 | A | 6/2000 | Kates | 381/318 |
| 6,097,823 | A * | 8/2000 | Kuo | 381/312 |
| 6,115,478 | A | 9/2000 | Schneider | 381/314 |
| 6,219,427 | B1 | 4/2001 | Kates et al. | 381/318 |
| 6,236,731 | B1 | 5/2001 | Brennan et al. | 381/316 |
| 6,240,192 | B1 | 5/2001 | Brennan et al. | 381/314 |
| 6,347,148 | B1 | 2/2002 | Brennan et al. | |
| 6,353,671 | B1 | 3/2002 | Kandel et al. | |
| 6,366,863 | B1 | 4/2002 | Bye et al. | 702/57 |
| 6,389,142 | B1 | 5/2002 | Hagen et al. | 381/313 |
| 6,434,246 | B1 | 8/2002 | Kates et al. | 381/312 |
| 6,434,247 | B1 | 8/2002 | Kates et al. | 381/312 |
| 6,449,662 | B1 | 9/2002 | Armitage | 710/8 |
| 6,496,581 | B1 * | 12/2002 | Finn et al. | 379/406.01 |
| 6,498,858 | B1 | 12/2002 | Kates | 381/318 |
| 6,563,931 | B1 | 5/2003 | Soli et al. | 381/318 |
| 6,594,365 | B1 | 7/2003 | Eatwell | |
| 2001/0002930 | A1 | 6/2001 | Kates | 381/317 |
| 2001/0007050 | A1 | 7/2001 | Adelman | 600/150 |
| 2002/0044667 | A1 | 4/2002 | Stott et al. | |
| 2002/0076073 | A1 | 6/2002 | Taenzer et al. | 381/315 |

FOREIGN PATENT DOCUMENTS

| | | |
|---|---|---|
| EP | 0581261 | 2/1994 |
| EP | 0924873 | 12/1997 |
| WO | WO-9960822 | 11/1999 |
| WO | WO-00/21332 | 4/2000 |

OTHER PUBLICATIONS

Griffing, Terry S., et al., "Custom canal and mini in-th-ear hearing aids", *Hearing Instruments*, vol. 34, No. 2, (Feb. 1983),31-32.

Griffing, Terry S., et al., "How to evaluate, sell, fit and modify canal aids", *Hearing Instruments*, vol. 35, No. 2, (Feb. 1984),3.

Kates, J. M., "Feedback Cancellation in Hearing Aids: Results from a Computer Simulation", *IEEE Transaction on Signal Processing*, 39(3), (Mar. 1991),553-562.

Mahon, William J., "Hearing Aids Get a Presidential Endorsement", *The Hearing Journal*,, (Oct. 1983),7-8.

Oppenheim, A. V., et al., *In: Discrete-Time Signal Processing*, Prentice-Hall,(1989),585-587.

Sullivan, Roy F., "Custom canal and concha hearing instruments: A real ear comparison", *Hearing Instruments*, vol. 40, No. 4, (Jul. 1989),5.

Sullivan, Roy F., "Custom canal and concha hearing instruments: A real ear comparison Part II", *Hearing Instruments*, vol. 40, No. 7, (Jul. 1989),6.

Virag, N., "Single Channel Speech Enhancement Based on Masking Properties on the Human Auditory System", *IEEE Tansactions on Speech and Audio Processing*, 7(2), (Mar. 1999),126-137.

Clancy, David A., "Highlighting developments in hearing aids", *Hearing Instruments*, (Dec. 1995), 2 pgs.

* cited by examiner

AUDIO SIGNAL PROCESSING

CROSS-REFERENCE TO RELATED APPLICATION(S)

This application is a continuation of U.S. patent application Ser. No. 09/393,463, filed on Sep. 10, 1999, the specification of which is incorporated herein by reference.

TECHNICAL FIELD

The present invention relates generally to audio signal processing. More particularly, it pertains to inhibiting undesired feedback signals in sound systems.

BACKGROUND INFORMATION

Sound systems can be broken down into three general components: an input device, such as a microphone; a processing system; and an output device, such as a speaker. Sounds are picked up by the microphone, transmitted to the processing system where they are processed, and then projected by the speaker so the sounds can be heard at an appropriate distance. Both the microphone and the speaker are generally considered to be transducers.

A transducer is a device that transforms one form of energy to another form of energy. In the case of a microphone, sound energy, which can be detected by the human ear in the range of 20 Hertz to 20,000 Hertz, is transformed into electrical energy in the form of an electrical signal. The electrical signal can then be processed by a processing system. After the signal is processed including amplification, the speaker transforms the electrical energy in the electrical signal to sound energy again.

This sound energy from the speaker (or a portion of this sound energy) may in turn be picked up by the microphone, and returned to the sound system. This is known as feedback, and in particular acoustic feedback. The presence of acoustic feedback may preclude the useful operation of hearing aids and other such sound systems (i.e., those with sound-sensing and sound-producing transducers). Even if the level of the feedback is sufficiently low, it may distort the production of sound at the speaker. At another level, the feedback may cause ringing effects that tend to reduce the intelligibility of speech. At high levels of feedback, a high-pitched squealing tone can be heard that dominates and excludes all other desired sounds produced by the sound system.

These effects are frustrating to users of sound systems in general, but are particularly debilitating for users of hearing aids since these users depend upon such aids to maintain their ability to communicate.

Several methods have been tried to eliminate unstable feedback. These include: 1) reducing the system's gain at and around the frequency of the feedback; 2) varying the phase of the system; and 3) using a filter to eliminate the feedback signal. The first method is undesirable; since feedback may occur at several or variable frequencies, the method requires a burdensome number of filters to isolate frequency regions of the feedback; in certain instances, the method yields audible artifacts in the output. The second method is also undesirable; phase shifting to eliminate feedback at one frequency is likely to produce feedback at a different, previously stable, frequency; this method also may produce audible processing artifacts. The third method represents a more desirable approach. However, many of the current implementations of the third method add other problems of their own.

In the third method, because of the variations in the feedback path over time, the filter itself should be sensitive to feedback variations. Filters used in hearing aids, for example, must be sensitive to mouth movements, use of a telephone, etc. Sensitivity of the filter can be adjusted by using three current different implementations: 1) by interrupting and injecting a signal into the feedback path as in U.S. Pat. No. 4,783,818; 2) by injecting a noise signal to accommodate changes in the acoustic coupling as in U.S. Pat. No. 5,259,033; and 3) by relying on ambient signals as in U.S. Pat. No. 5,402,496. The first implementation adds audible and annoying sounds to the listener. The second implementation requires a long duration for providing the filter with needed information, and thus exposing the listener to a longer duration of unstable feedback. The third implementation can be corrupted by persistent correlations in the ambient signals. These correlations limit the ability of the filter to cleanly and effectively inhibit feedback.

Thus, what is needed are systems, devices, and methods to inhibit undesired feedback in sound systems.

SUMMARY

The above-mentioned problems with feedback in audio signal processing as well as other problems are addressed by the present invention and will be understood by reading and studying the following specification. Systems, devices, and methods are described which inhibit undesired feedback.

One illustrative embodiment includes a method of processing audio signals. The method comprises inhibiting at least one feedback component of an input audio signal by adjusting a feedback-inhibiting filter through a narrowband high signal-to-noise subaudible probe signal.

One illustrative embodiment includes a method of processing at least one audio signal that comprises filtering a processed signal by a notch filter to form a filtered signal. The method further comprises sending a subaudible narrowband signal having a first bandwidth into the filtered signal to form a probe signal to probe a feedback path having a second bandwidth.

One illustrative embodiment includes a system for enhancing audio signals. The system comprises at least one detector to detect undesired feedback in an input audio signal; at least one notch filter to filter a processed signal, wherein the notch filter provides a filtered signal; and at least one probe generator to generate a probe signal to probe a feedback path.

One illustrative embodiment includes a probe generator to generate a probe signal to probe a feedback path. The probe generator is receptive to a feedback indicator parameter. The probe generator comprises an amplitude indicator to indicate an amplitude level of the probe signal. The amplitude indicator provides an amplitude signal. The probe generator also comprises a frequency indicator to indicate a frequency of the probe signal. The frequency indicator provides a frequency signal. In one embodiment, the frequency signal is a value. The probe generator further comprises a signal generator that is receptive to the amplitude signal and the frequency signal to generate the probe signal.

One illustrative embodiment includes a method of generating a probe signal. The method comprises generating an amplitude signal that is indicative of an amplitude level of the probe signal, generating a frequency signal that is indicative of a frequency of the probe signal, and generating a signal that is based on the amplitude signal and the frequency signal.

One illustrative embodiment includes a filter adjuster to adjust a filter by providing a set of filter coefficients. The filter adjuster comprises a modeler receptive to a feedback indicator parameter, an input signal, and an output signal to model at least one proposed response of a feedback path when the feedback path is probed with a probe signal at a predetermined frequency. The modeler provides at least one sample that is representative of the at least one response of the feedback path. The filter adjuster further comprises a discrete-Fourier-transformer, such as an inverse fast-Fourier-transformer, to transform the at least one sample to obtain at least one filter coefficient.

One illustrative embodiment includes a method to adjust a filter by providing a set of filter coefficients. The method comprises modeling at least one response of a feedback path to provide at least one sample that is indicative of at least one response of the feedback path, and transforming at least one sample by using a discrete-Fourier-transform, such as an inverse fast-Fourier-transform, to obtain at least one filter coefficient.

These and other embodiments, aspects, advantages, and features of the present invention will be set forth in part in the description which follows, and in part will become apparent to those skilled in the art by reference to the following description of the invention and drawings or by practice of the invention. The aspects, advantages, and features of the invention are realized and attained by means of the instrumentalities, procedures, and combinations particularly pointed out in the appended claims.

DETAILED DESCRIPTION

Figure 1:
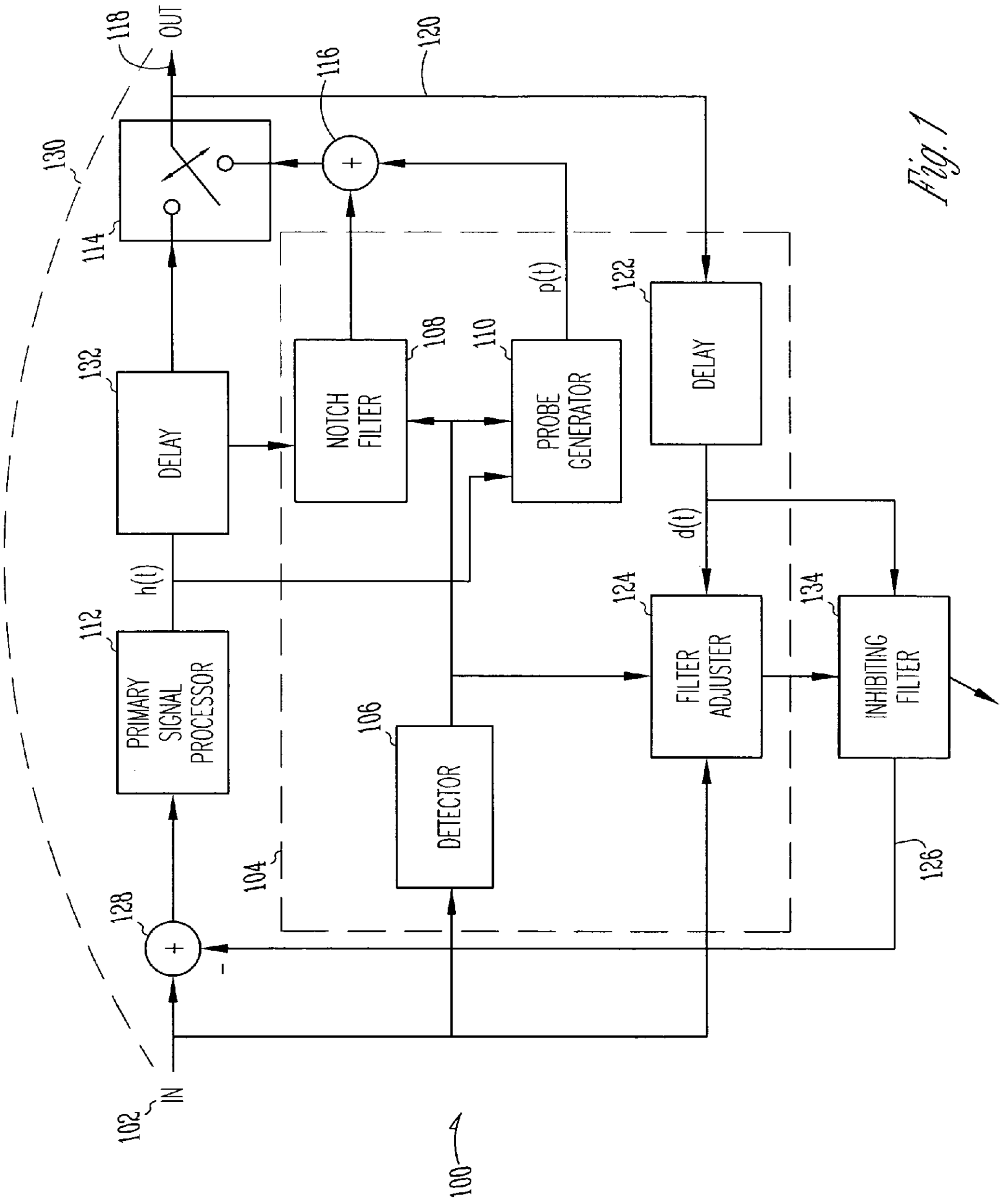
FIG. 1 is a block diagram illustrating a system in accordance with one embodiment.

In the following detailed description of the invention, reference is made to the accompanying drawings that form a part hereof, and in which are shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention.

The embodiments described herein focus on adjusting a filter used to compensate for undesired feedback, such as acoustic feedback or mechanical feedback, in sound systems that include certain configurations of sound-sensing and sound-producing transducers, such as microphone and speaker. An ear-worn hearing aid is an example of such sound systems.

The embodiments include a method of adjusting a feedback-inhibiting filter through the use of a probe signal that is subaudible to the system user and has a relatively high signal-to-noise ratio (SNR), allowing accurate and rapid filter updating. In one embodiment, the term subaudible is understood to mean the inability of the human ear to detect the probe signal. In another embodiment, the term subaudible is understood to mean the inclusion of an insubstantial level of the probe signal that may be detected by the human ear. The method sends a subaudible narrowband probe signal, which is centered on the undesired feedback component, while selectively, simultaneously, and temporarily placing a notch filter, which is also centered on the undesired feedback component, in the system's signal path. The term narrowband is understood to mean the inclusion of a limited range of frequencies. The feedback-inhibiting filter is adjusted by comparing the system output signal and the signal picked up at a sound-producing transducer, such as a microphone. Once the feedback-inhibiting filter is updated, the function of the notch filter may be selectively bypassed.

The embodiments use an audibility model to determine the sensation level of the probe signal. The term "sensation level" is understood to mean the inclusion of a level of a sound signal relative to a level that can be detected by a listener in the context of the current environmental signals as transduced through the sound system. Audibility criteria have found usage in low-bit-rate coding schemes, as in U.S. Pat. No. 5,706,392, and have also found usage in other signal-processing fields, as in Nathalie Virag, *Single Channel Speech Enhancement Based on Masking Properties of the Human Auditory System*, IEEE Transactions on Speech and Audio Processing, 7:2, p. 126–137 (1999). In one embodiment described herein, once the level of the audibility criterion is established, the level of the probe signal is adjusted such that it is at or below the audibility criterion level. In another embodiment, adjusting the level of the probe signal can be as simple as making it a constant fraction of a level in a bandpass region centered just below the probe region. The probe signal is a narrowband signal that is sent into the feedback path to derive information about the feedback path. Using the constant fraction would be beneficial since it may greatly simplify the computations involved.

In one embodiment, the reason for placing the level of the probe signal a fraction of a level in the bandpass region centered just below the probe region is to determine with greater precision regarding the sensation level. The energy in the region just below the probe frequency may be highly correlated with the sensation level. That energy is the information the audibility model may need to determine the level of the probe signal. If the bandpass region is too far away from the probe region, weaker correlation may occur, and determination of the sensation level may be erroneous. If the bandpass region is centered upon the probe frequency, then the probe energy may return from the feedback path to establish another undesired feedback loop.

The narrowband technique as described in the embodiments herein has several advantages over existing implementations. Since the probe is narrowband, it may be easily masked by wider-bandwidth environmental signals while retaining a relatively high within-band signal-to-noise ratio. In one embodiment, this is due in part to the presence of the notch filter. In another embodiment, by temporarily blocking out only a narrowband, such as by using the notch filter, of a wideband signal, the technique maintains information transmission with no degradation; unlike other implementations, such blocking is also subaudible to the listener. In yet another embodiment, by placing the notch filter at the frequency of the undesired feedback, the technique eliminates the undesired feedback and increases the signal-to-noise ratio of the probe signal. In a further embodiment, by using a sent signal, the technique overcomes the correlation problems caused by relying on ambient signals as probe signals.

FIG. 1 is a block diagram of a system in accordance with one embodiment. The system 100 includes an input audio signal 102 that may have been generated from a transducer, such as a microphone, or previous signal processing stages. The input audio signal 102 may also contain at least one feedback component due to the feedback path 130.

The input audio signal 102 is presented to a combiner 128. At the combiner 128, the input audio signal 102 is combined with a filtered signal 126 to provide a combined signal. This combined signal is presented to a primary signal processor 112. The primary signal processor 112 provides primary signal processing for the system 100. In one embodiment, the primary signal processor 112 provides compressive amplification. The primary signal processor 112 processes the combined signal and presents a processed signal to a feedback compensation system 104 and a delay 132. The processed signal is optionally delayed by a delay 132 to provide a delayed processed signal. The delay 132 compensates for the delay in generating a probe signal so that a high amplitude level of the probe signal may be used. The processed signal may contain at least one feedback component that is present in the input audio signal 102. The delayed processed signal is presented to the switch 114. In one embodiment, the term "switch" means the inclusion of a software switch implemented in a digital signal processor.

The input signal 102 is also presented to the feedback compensation system 104. The input audio signal 102 is presented to a detector 106 of the feedback compensation system 104. The detector 106 detects the presence of at least one undesired feedback component of the input audio signal 102. The detector 106 controls at least two aspects of probing the feedback path 130: The detector determines when the feedback path 130 will be probed and it determines a range of frequencies where the feedback path 130 will be probed. The detector 106 issues a feedback indicator parameter signal to a notch filter 108, a probe generator 110, and a filter adjuster 124.

The notch filter 108 is receptive of the feedback indicator parameter signal from the detector 106 and the delayed processed signal from the delay 132. In one embodiment, the notch filter 108 is configured to have a bandwidth that is centered upon the bandwidth of at least one undesired feedback component of the processed signal. In another embodiment, the notch filter is an infinite impulse response filter. In yet another embodiment, the greater the notch filter attenuates the processed signal, the better the signal-to-noise ratio of the probe signal. The notch filter provides a notch filter signal to a combiner 116.

The probe generator 110 is receptive of the feedback indicator parameter signal from the detector 106 and the processed signal from the primary signal processor 112. The probe generator 110 is configured to have a bandwidth that is centered upon the bandwidth of undesired feedback component of the processed signal. The probe generator 110 generates a probe signal to probe the feedback path 130 and presents it to the combiner 116.

The combiner 116 combines the notch filter signal from the notch filter 108 and the probe signal from the probe generator 110 and presents the combined signal to the switch 114. When the system is not probing the feedback path 130, the switch 114 outputs the delayed processed signal from the delay 132 as output signal 118. When the system is configured to probe the feedback path 130, the switch 114 is receptive to the combined signal from the combiner 116. The switch 114 presents the combined signal as the output signal 118. The output signal is returned to the feedback compensation system 104 by way of an internal feedback path 120. An internal feedback signal in the internal feedback path 120 is optionally delayed by a delay 122 to form a delayed internal feedback signal. This signal is presented to a filter adjuster 124 and an inhibiting filter 134.

The filter adjuster 124 is receptive to three signals: the feedback indicator parameter signal from the detector 106, the input audio signal 102, and the delayed internal feedback signal. In one embodiment, the filter adjuster 124 calculates at least one filter coefficient to adjust the inhibiting filter 134. In another embodiment, it calculates a set of filter coefficients. These coefficients are generated by comparing the input audio signal 102 and the delayed internal feedback signal to determine the amplitude and phase responses of the feedback path 130 at a selected probe frequency. After such calculation, the filter adjuster 124 presents the coefficients to the inhibiting filter 134.

The inhibiting filter 134 is receptive to the delayed internal feedback signal and the coefficients from the filter adjuster 124. It generates a filtered signal 126 that is representative of the undesired feedback component of the input signal 102 and presents such signal to the combiner 128. In one embodiment, the inhibiting filter 134 produces the filtered signal 126 by approximating the response of the feedback path 130.

The combiner 128 subtracts such undesired feedback components from the input signal 102 so as to inhibit undesired feedback from affecting the sound quality of the system 100.

In one embodiment, the feedback compensation system 104 can compensate for multiple undesired feedback components contemporaneously. Such compensation can be carried out by the following technique: The detector 106 produces a plurality of feedback indicator parameters. The notch filter 108 receptive to the plurality of feedback indicator parameters filters a plurality of regions in the optionally delayed processed signal to provide a filtered signal. The probe generator 110 also receptive to the plurality of feedback indicator parameters generates multiple probe signals that are combined together to provide a combined probe signal. The combiner 116 combines the filtered signal and the combined probe signal, and this combined signal is presented at the switch 114 to become the output signal 118. The filter adjuster 124 is receptive to the plurality of feedback indicator parameters among other signals as described heretofore. The inhibiting filter 134 is receptive of the output of the filter adjuster 124 and produces a filtered signal 126. This filtered signal 126 is presented to the combiner 128 to inhibit at least one undesired feedback component in the system 100.

In one embodiment, the implementation of the compensation described heretofore includes using multiple detectors 106 in a parallel fashion; multiple notch filters 108 in a series fashion; and multiple probe generators 110 in a parallel fashion.

Figure 2:
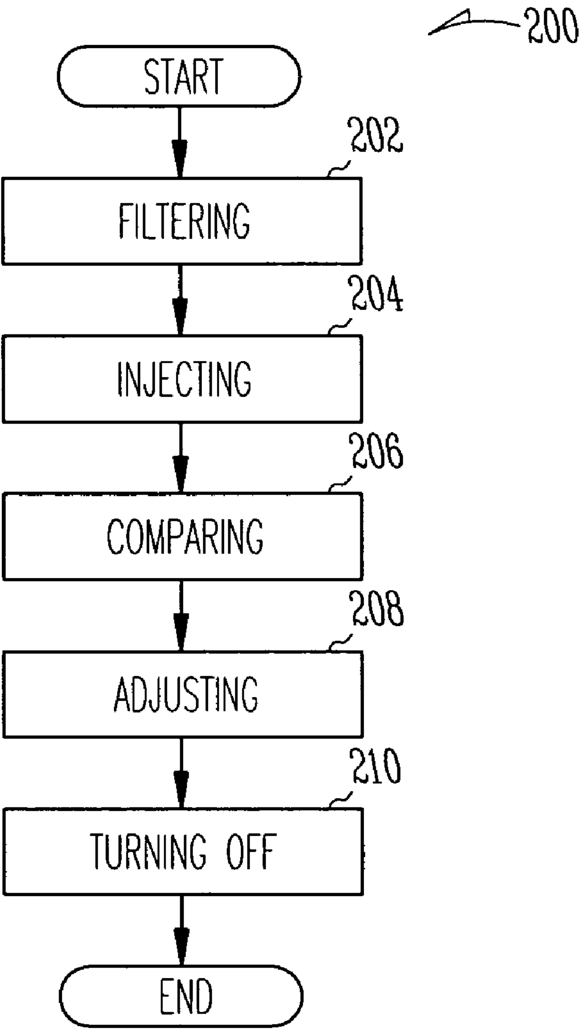
FIG. 2 is a process diagram illustrating a method in accordance with one embodiment.

FIG. 2 is a process diagram of a method in accordance with one embodiment. The process 200 begins at block 202 by filtering a processed signal from a primary signal processor using a notch filter to form a filtered signal. Next at block 204, the process sends a subaudible narrowband signal as a probe signal into a feedback path. The bandwidth of the probe signal is designed to center on the bandwidth of the undesired feedback component of the feedback path. At block 206, the process compares the probe signal to an input audio signal to approximate the behavior of the feedback path. Such comparison yields a set of coefficients. These coefficients are used at block 208 to adjust selectively a feedback-inhibiting filter so as to inhibit at least one audio artifact associated with the feedback path in a sound system. Optionally, at block 210, the notch filter is turned off after the inhibiting filter has been adjusted.

Figure 3:
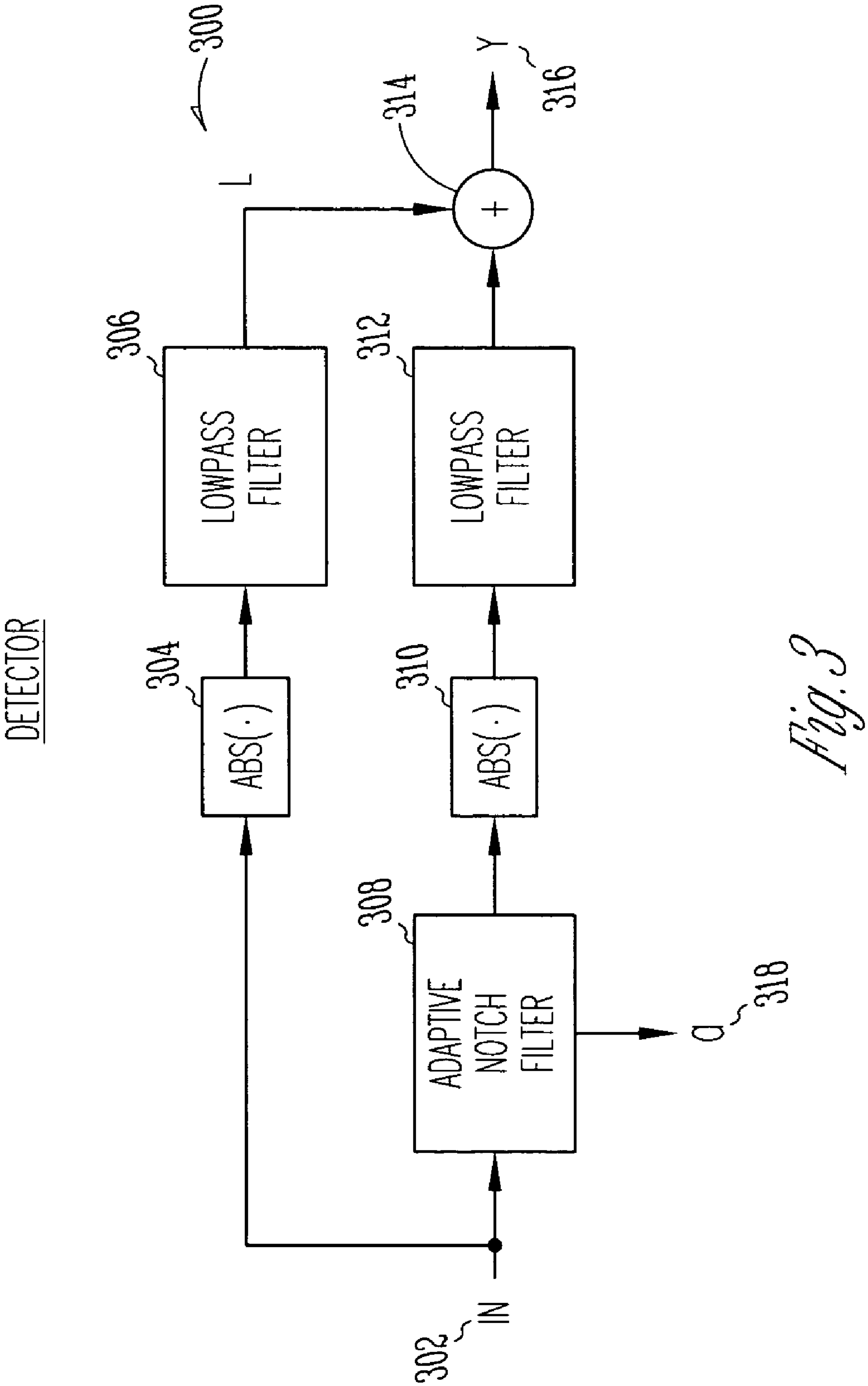
FIG. 3 is a block diagram illustrating a detector in accordance with one embodiment.

FIG. 3 is a block diagram of a detector in accordance with one embodiment. The detector 300 determines the presence of undesired feedback and a range of feedback frequencies. If no undesired feedback is detected, the detector 300 either sequences through pre-selected probe frequencies or refrains temporarily from further probing. The detector 300 is receptive of an input signal 302. The input signal 302 is presented to a notch filter 308. The notch filter 308 produces a tracking signal 318 and a filtered signal. The tracking signal 318 tracks at least one feedback component in the input signal 302. In one embodiment, the tracking signal 318 is indicative of the frequency of the undesired feedback component in the sound system. In another embodiment, the tracking signal 318 tracks the highest energy sinusoidal component in the input signal 302. In one embodiment, the notch filter is an adaptive notch filter. In another embodiment, the notch filter is a second-order infinite impulse response filter. In another embodiment, the notch filter is a finite impulse response filter. In another embodiment, the notch filter is a wave-digital filter. Other filters may be used without departing from the scope of the present invention.

The filtered signal is rectified, such as full-wave rectified, by the absolute block 310 and the lowpass filter 312. This rectified signal is presented at a combiner 314. The input signal 302 is also rectified, such as full-wave rectified, by the absolute block 304 and the lowpass filter 306. This rectified signal is also presented at the combiner 314. In another embodiment, full-wave rectification can be accomplished by using a squaring technique. Other rectification techniques, including full-wave or half-wave rectification, can be used without departing from the scope of the present invention.

The combiner 314 produces a difference signal 316 from the two rectified signals. The presence of undesired feedback is detected when the level of the difference signal 316 is at a predetermined proportion with respect to the input signal 302. If such presence of feedback is detected, the tracking signal 318 is indicative of the feedback frequency; the tracking signal is then set to the closest value available from a predetermined set of values representing a range of feedback frequencies.

Figure 4:
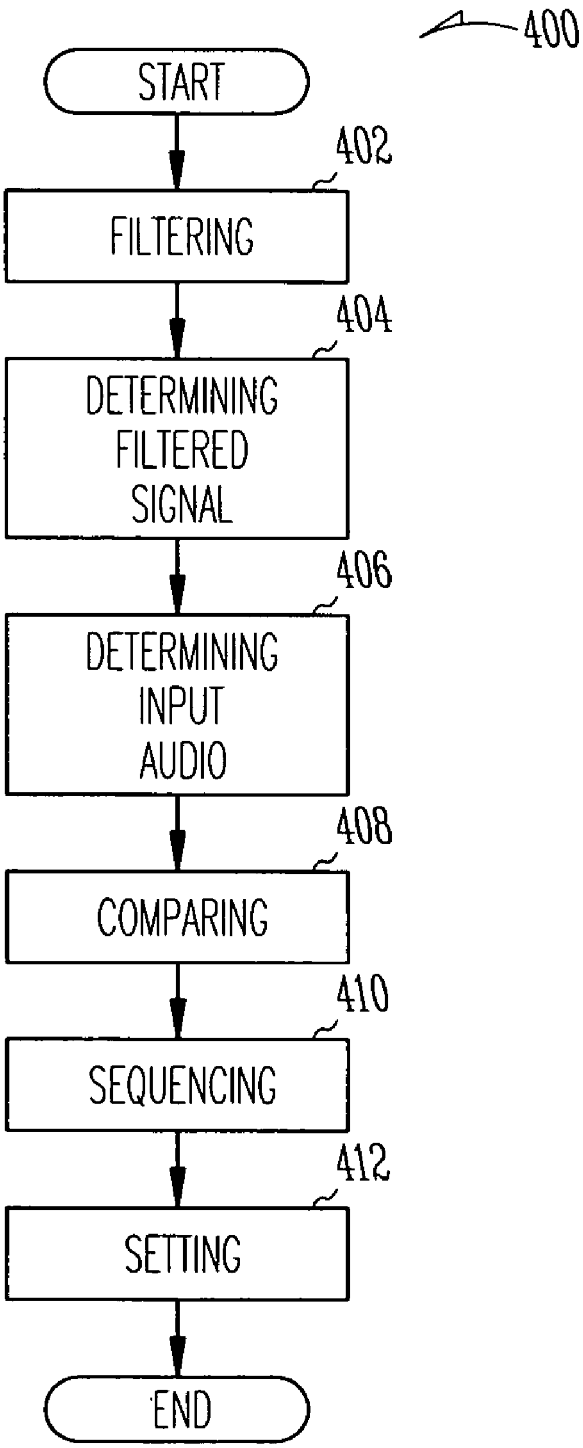
FIG. 4 is a process diagram illustrating a method in accordance with one embodiment.

FIG. 4 is a process diagram illustrating a method in accordance with one embodiment. The process 400 begins at block 402 by filtering an input audio signal with a notch filter to provide a filtered signal. Next at block 404, the process determines the level of the filtered signal by lowpass filtering the absolute value of the filtered signal to provide a first rectified signal. At block 406, the process determines the level of the input audio signal by lowpass filtering the absolute value of the input audio signal to provide a second rectified signal. At block 408, the process compares the first and second rectified signals to determine if the difference between the two rectified signals is at a predetermined proportion with respect to the input audio signal. If the difference is at such a proportion, undesired feedback is present in the sound system. Optionally at block 410, the process sequences selectively through a predetermined set of frequencies where a feedback path can be probed if undesired feedback has not been found at a selected probed frequency. At block 412, the process sets a feedback parameter close to a predetermined set of values so as to indicate that undesired feedback is present at a certain range of frequencies.

Figure 5:
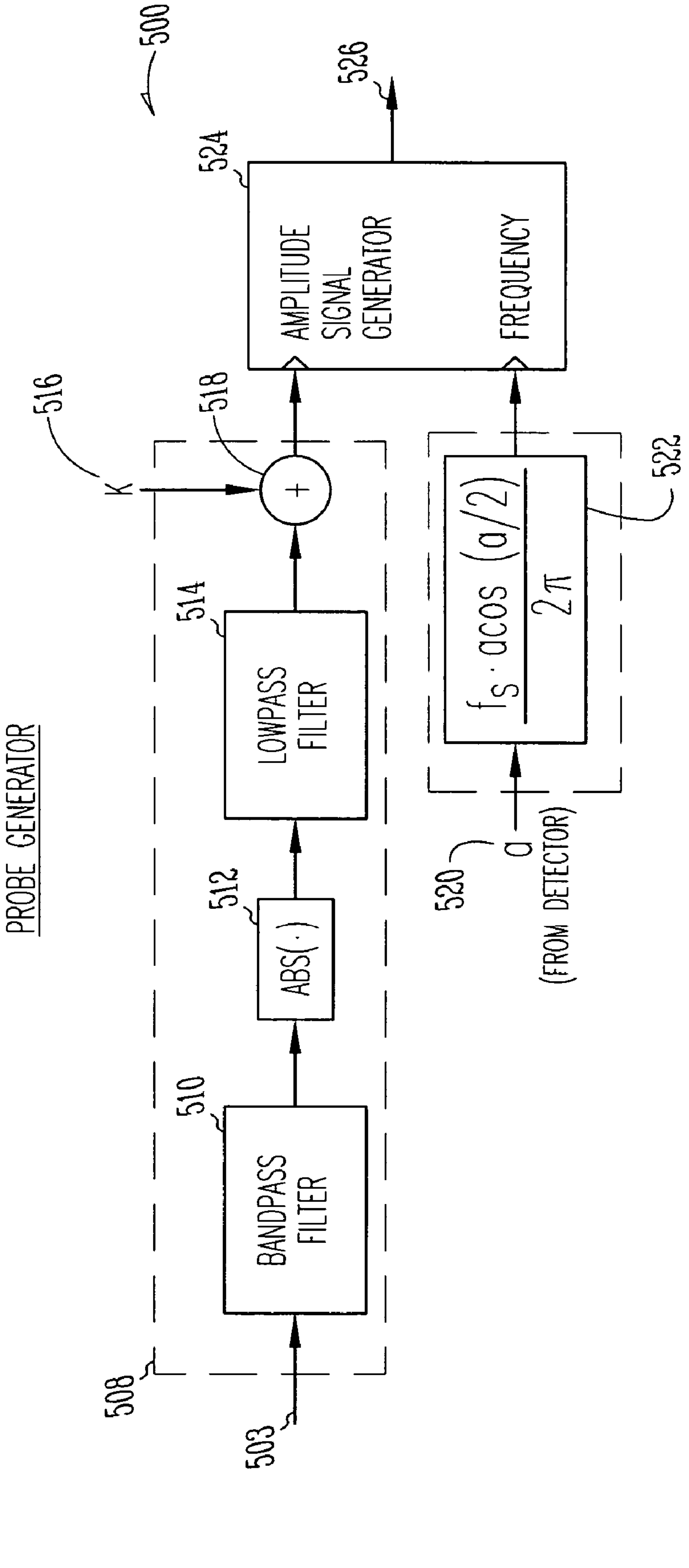
FIG. 5 is a block diagram illustrating a probe generator in accordance with one embodiment.

FIG. 5 is a block diagram illustrating a probe generator in accordance with one embodiment. The purpose of the probe generator 500 is to generate a probe signal to probe a feedback path. In one embodiment, the probe signal is a sinusoidal signal with a predetermined frequency as described herein. In another embodiment, the probe signal is a narrowband noise signal. The probe generator 500 is receptive to a processed signal 503. This processed signal 503 is an input audio signal that has been processed by the sound system, such as for amplification. In one embodiment, the processed signal 503 includes an environmental context of at least one listener.

The amplitude indicator 508 processes the processed signal 503 and sets an amplitude level of the probe signal. The processed signal 503 is filtered by a bandpass filter 510. In one embodiment, the bandpass filter is about 150 Hertz wide. In another embodiment, the bandpass filter response is centered just below the response of the notch filter 108 of FIG. 1. Next, the filtered signal is rectified, such as full-wave rectified, by the absolute block 512 and the lowpass filter 514. The rectified signal is then modulated by the multiplier 518 with an empirical constant 516 to provide an amplitude signal. In one embodiment, this amplitude signal has a level that is about 0 to −3 dB relative to the level of the filtered signal of the bandpass filter 510. In one embodiment, the empirical constant is about 0.71 to 1.0. In one embodiment, the bandpass filter is selected with a predetermined frequency response to attenuate the amplitude level of the probe signal so as to inhibit at least one undesired feedback component that is initiated by the probe signal.

The probe generator 500 is also receptive to a feedback parameter signal 520. The feedback parameter 520 is fed into a frequency indicator 522 to set a frequency of the probe signal. The frequency indicator 522 emulates a function: $(f_s{*}a\cos(a/2))/2p)$. $f_s$ is the sampling frequency of the sound system that the probe generator is a part of. a is the feedback parameter 520. acos is the inverse cosine function.

The output of the amplitude indicator 508 and the frequency indicator 522 are fed into a signal generator 524. The signal generator 524 produces a probe signal at a certain amplitude level and frequency that are determined by the output of the amplitude indicator 508 and the output of the frequency indicator 522. In one embodiment, the signal generator 524 produces a sinusoidal signal. In another embodiment, the signal generator 524 produces a narrowband noise signal.

Figure 6:
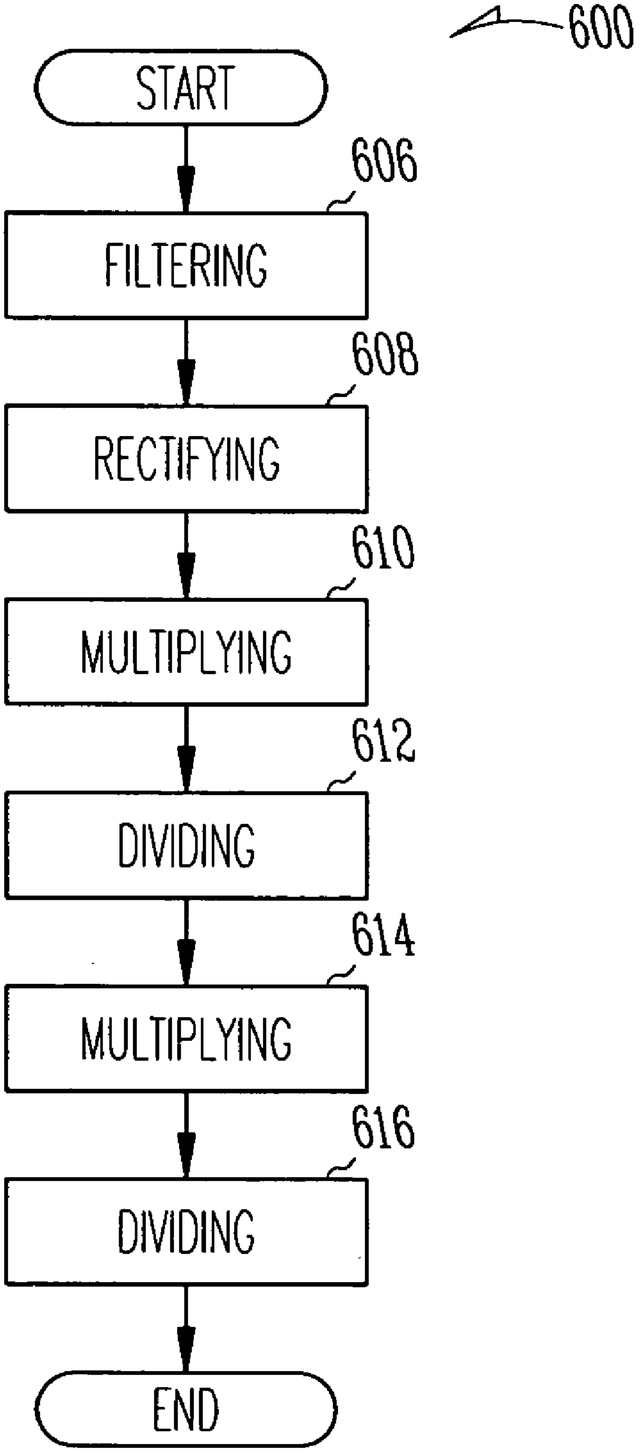
FIG. 6 is a process diagram illustrating a method in accordance with one embodiment.

FIG. 6 is a process diagram illustrating a method in accordance with one embodiment. The process 600 begins by generating an amplitude signal that is indicative of an amplitude level of the probe signal. The generation of the amplitude signal begins by filtering the processed signal with a bandpass filter at block 606. The filtered signal is then rectified at block 608. Subsequently, the rectified signal is multiplied by an empirical constant to provide the amplitude signal.

Next, the process 600 generates the frequency signal that is indicative of the frequency of the probe signal. In one embodiment, the frequency signal is a constant value. The process begins at block 612 by dividing a feedback indicator parameter by two to provide a divided signal, taking the inverse cosine of the divided signal to provide an acos signal, multiplying the acos signal with the sampling rate of a sound system to provide a multiplied signal at block 614, and dividing the multiplied signal by 2p to provide a frequency signal at block 616. Both the amplitude signal and the frequency signal are input into a signal generator to produce the probe signal.

Figure 7:
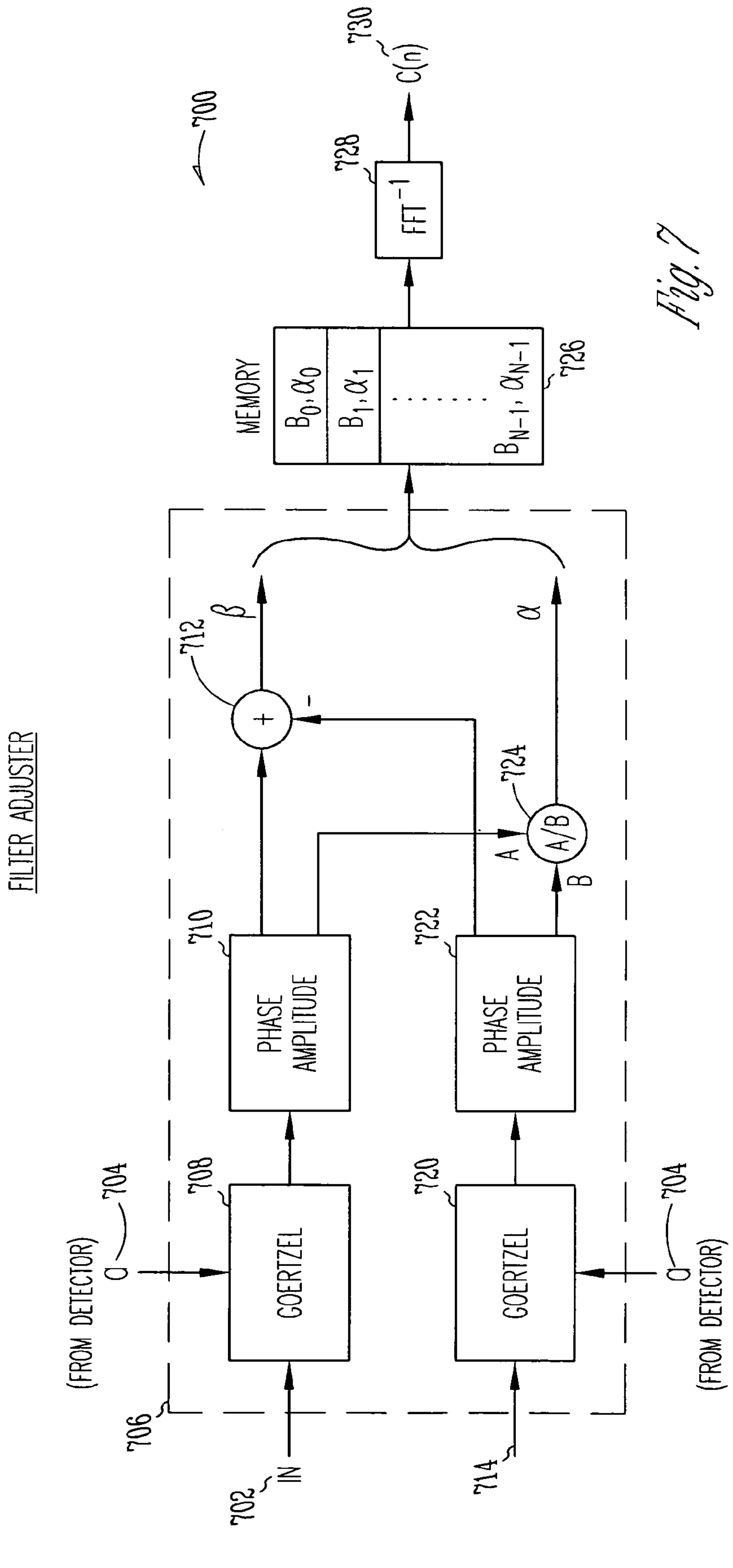
FIG. 7 is a block diagram illustrating a filter adjuster in accordance with one embodiment.

FIG. 7 is a block diagram illustrating a filter adjuster in accordance with one embodiment. The filter adjuster 700 receives input signal 702, internal feedback signal 714, and feedback indicator parameter 704 and presents those signals to a modeler 706. The modeler 706 models at least one response of a feedback path when the feedback path is probed with a probe signal at a predetermined frequency. The modeler 706 provides at least one sample that is representative of at least a response of the feedback path to certain probed frequencies.

The input signal 702 is presented to a Goertzel transformer 708 with the feedback indicator parameter 704. The Goertzel transformer 708 produces a complex signal having phase and amplitude components. In other word, the Goertzel transformer 708 produces the in-phase and quadrature component amplitudes of a signal at a given frequency. The frequencies at which the Goertzel algorithm can be applied are integer multiples of a fraction of a sampling rate of the system. Thus, in one embodiment, the probe frequency may be one of these frequencies. The phase and amplitude components are separated at block 710. The phase component is input into a combiner 712 and the amplitude component is input into a divider 724.

The internal feedback signal 714 is input into a Goertzel transformer 720 along with the feedback indicator parameter 704. The Goertzel transformer 720 produces a complex signal having phase and amplitude components. These two components are separated at block 722. The phase component is input into a combiner 712 and the amplitude component is input into a divider 724.

The combiner 712 combines the two phase components to provide a difference signal Beta. The divider 724 divides the two amplitude components to provide a ratio signal Alpha. Each Beta and Alpha forms a sample that together with other samples may be representative of the frequency response of the feedback path. Each sample is stored in memory 726. Each sample is obtained by probing the feedback path at desired frequencies. In one embodiment, for a particular undesired feedback frequency, a plurality of samples are taken, and these samples are averaged to provide an average sample; the term "average" means the inclusion of separately averaging the Betas and separately averaging the Alphas; these averaged Betas and averaged Alphas form the average sample.

In one embodiment, the filter adjuster 700 optionally performs a discrete-Fourier-transform, such as an inverse fast-Fourier-transform, on at least one of the samples stored in memory 726 to provide a vector signal 730. This vector signal 730 contains a set of filter coefficients used to adjust an inhibiting filter, which operates in the time domain, to inhibit undesired feedback in a sound system. In another embodiment, the inhibiting filter uses at least one of the samples stored in memory 726 when the inhibiting filter is operated in the frequency domain. In another embodiment, the sound system may operate in both time and frequency domains, so that both the samples stored in memory 726 and the vector signal 730 are used. In another embodiment, the vector signal 730 may be windowed. In another embodiment, the filter coefficients are updated by adding separately weighted sines and cosines of a single frequency, where the weighting depends on the change in the Alpha and Beta for the single frequency.

Figure 8:
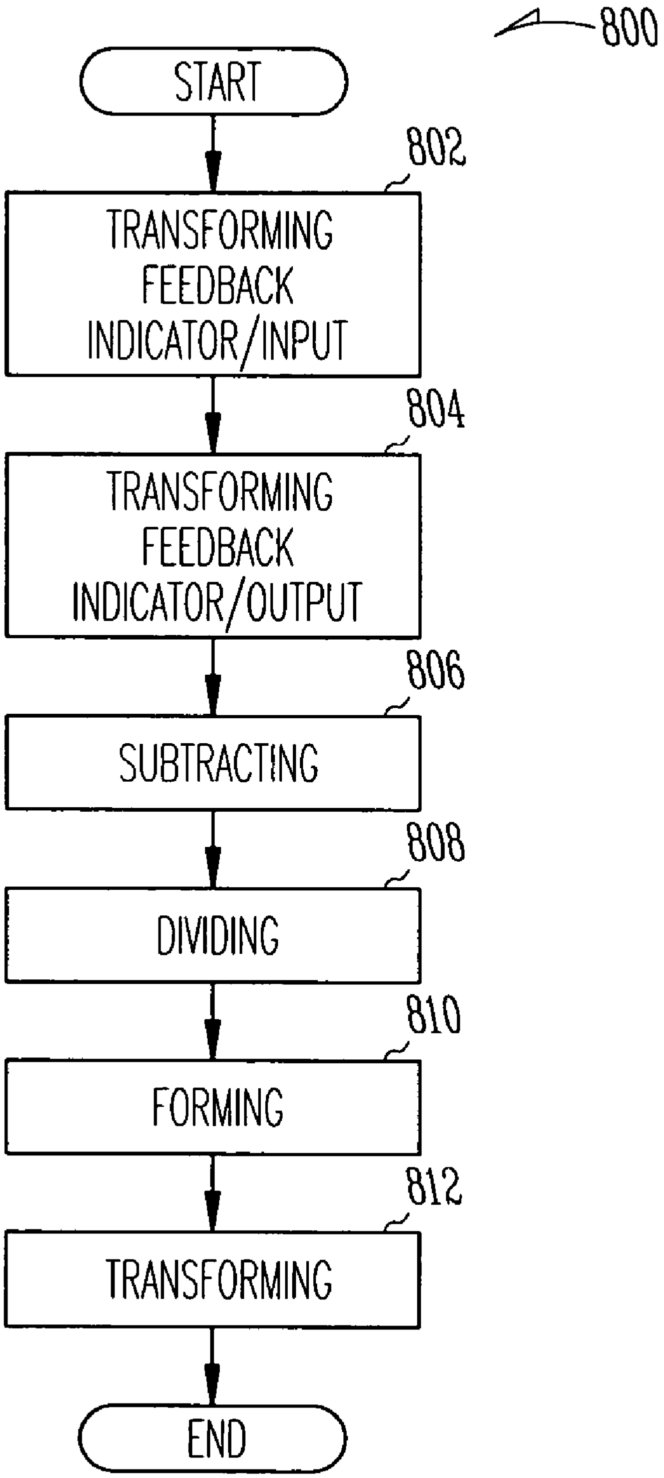
FIG. 8 is a process diagram illustrating a method in accordance with one embodiment.

FIG. 8 is a process diagram illustrating a method in accordance with one embodiment. The process 800 models at least one response of a feedback path to provide at least one sample. This sample is indicative of the response of the feedback path. This modeling technique begins at block 802 where a feedback indicator parameter and an input signal are transformed using a Goertzel transformer to provide a complex signal having a certain phase and a certain amplitude. At block 804, another Goertzel transformer is used to transform a feedback indicator parameter and a feedback signal to provide for another complex signal. At block 806, the phases are subtracted to form a difference signal. At block 808, the amplitudes are divided to form a ratio signal. The difference signal and the ratio signal together form a sample, at block 810, that models at least a response of the feedback path. It is understood that the described process from blocks 802 to 810 may be iterated to form a set of samples. In one embodiment, these samples are discrete-Fourier-transformed, such as inversely fast-Fourier-transformed, at block 812, to obtain a vector containing a set of coefficients to adjust an inhibiting filter to inhibit undesired feedback in a sound system; this vector can be used in systems that operate in the time domain. In another embodiment, the set of samples is used without being discrete-Fourier-transformed, such as inversely fast-Fourier-transformed; this set of samples can be used in systems that operate in the frequency domain. However, in another embodiment, both the vector and the set of samples can be used in systems that operate in both the time domain and the frequency domain.

CONCLUSION

Thus, systems, devices, and methods have been described for inhibiting undesired feedback in audio processing systems.

Although the specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative and not restrictive. Combinations of the above embodiments and other embodiments will be apparent to those of skill in the art upon reviewing the above description. The scope of the invention includes any other applications in which the above structures and fabrication methods are used. Accordingly, the scope of the invention should only be determined with reference to the appended claims, along with the full scope of equivalents to which such claims are entitled.

What is claimed is:

1. A method of processing audio signals comprising:

processing an input audio signal having one or more feedback components associated with an acoustic feedback path to provide a processed signal;

detecting a feedback component of the one or more feedback components in the input audio signal;

generating a narrowband subaudible probe signal using the processed signal and the detected feedback component;

feeding forward the generated narrowband subaudible probe signal to an output for the processed signal to probe the acoustic feedback path with an acoustic subaudible probe signal; and adjusting a feedback-inhibiting filter using the narrowband subaudible probe signal to inhibit the feedback component in the input audio signal.

2. The method of claim 1, wherein the method further includes selectively delaying the processed signal to compensate for a delay in generating the narrowband subaudible probe signal to allow for the use of a high amplitude level in the narrowband subaudible probe signal.

3. The method of claim 1, wherein the method further includes forming the narrowband subaudible probe signal by:

filtering the processed signal with a notch filter having a bandwidth to form a filtered signal, the notch filter configured to center its bandwidth on a bandwidth of the detected feedback component; and sending a subaudible narrowband signal having a first bandwidth into the filtered signal to form the narrowband subaudible probe signal having a second bandwidth to probe the feedback path.

4. The method of claim 3, wherein the method farther includes:

comparing the narrowband subaudible probe signal to the input audio signal; and adjusting the inhibiting filter in response to the comparison to inhibit the feedback component.

5. The method of claim 3, wherein the method further includes selectively turning off filtering the processed signal with the notch filter when the inhibiting filter is adjusted.

6. The method of claim 3, wherein the method further includes sending the narrowband subaudible probe signal at a level determined using an audibility model.

7. The method of claim 6, wherein sending the narrowband subaudible probe signal at a level determined using an audibility model includes sending the narrowband subaudible probe signal at a level about equal to a criterion level of the audibility model.

8. The method of claim 6, wherein sending the narrowband subaudible probe signal at a level determined using an audibility model includes sending the narrowband subaudible probe signal at a level below a criterion level of the audibility model.

9. A method of processing audio signals comprising:

processing an input audio signal having one or more feedback components associated with an acoustic feedback path to provide a processed signal;

detecting a feedback component of the one or more feedback components in the input audio signal;

generating a narrowband subaudible probe signal using the processed signal and the detected feedback component;

feeding forward the generated narrowband subaudible probe signal to an output for the processed signal to probe the acoustic feedback path with an acoustic subaudible probe signal; and adjusting a feedback-inhibiting filter using the narrowband subaudible probe signal to inhibit the feedback component in the input audio signal, wherein the method further includes forming the narrowband subaudible probe signal by:

generating an amplitude signal that is indicative of an amplitude level for the probe signal;

generating a frequency signal that is indicative of a frequency for the probe signal; and generating a sinusoidal signal that is based on the amplitude signal and the frequency signal.

10. The method of claim 9, wherein generating an amplitude signal includes:

filtering the processed signal with a bandpass filter to form a filtered signal;

rectifying the filtered signal to form a rectified signal; and multiplying the rectified signal with an empirical constant to provide the amplitude signal.

11. The method of claim 9, wherein generating a frequency signal includes:

dividing a feedback indicator parameter by two to provide a first divided signal;

taking the arccosine of the first divided signal to provide an arccosine signal;

multiplying the arccosine signal with a sampling rate to provide a multiplied signal; and dividing the multiplied signal by 2 times pi to provide the frequency signal.

12. A method of processing audio signals comprising:

processing an input audio signal having one or more feedback components associated with an acoustic feedback path to provide a processed signal;

detecting a feedback component of the one or more feedback components in the input audio signal;

generating a narrowband subaudible probe signal using the processed signal and the detected feedback component;

feeding forward the generated narrowband subaudible probe signal to an output for the processed signal to probe the acoustic feedback path with an acoustic subaudible probe signal; and adjusting a feedback-inhibiting filter using the narrowband subaudible probe signal to inhibit the feedback component in the input audio signal, wherein adjusting a feedback-inhibiting filter includes:

modeling a response of the acoustic feedback path to provide a sample that is indicative of the response of the feedback path;

transforming selectively the sample by using a discrete-Fourier-transform to obtain a filter coefficient; and providing one ore more filter coefficients to the feedback-inhibiting filter.

13. The method of claim 12, wherein modeling a response includes:

transforming a feedback indicator parameter and the audio input signal to provide a first complex signal having a first phase and a first amplitude; and transforming the feedback indicator parameter and an output signal to provide a second complex signal having a second phase and second amplitude.

14. The method of claim 13, wherein modeling further comprises:

determining a difference between the first and the second phase by subtraction to provide a difference signal; and determining a ratio between the first amplitude and the second amplitude by division to provide a ratio signal.

15. The method of claim 14, wherein modeling further comprises forming the sample from the difference signal and the ratio signal.

16. The method of claim 15, wherein modeling further comprises averaging the sample.

17. A system for enhancing audio signals comprising:

a signal processor for processing an input audio signal to provide a processed signal, the input audio signal having a feedback component, the feedback component associated with an acoustic feedback path;

a detector to detect the feedback component in the input audio signal;

a probe generator to generate a probe signal using the processed signal and a signal provided by the detector in response to the detector detecting the feedback component;

an inhibiting filter to inhibit the feedback component in the input audio signal; and an output to output a narrowband subaudible probe signal formed from the probe signal fed forward from the probe generator, the narrowband subaudible probe signal used to probe the acoustic feedback path with an acoustic subaudible probe signal.

18. The system of claim 17, wherein the system further includes a switch to selectively provide the output with the processed signal or the narrowband subaudible probe signal.

19. The system of claim 17, wherein the signal processor includes a compressive amplifier.

20. The system of claim 17, wherein the system further includes a combiner to subtract a derived signal from the input audio signal, the derived signal representing a version of the feedback component, the derived signal provided by the inhibiting filter approximating a response of the acoustic feedback path.

21. The system of claim 17, wherein the detector is adapted to determine when the acoustic feedback path will be probed.

22. The system of claim 17, wherein the detector is adapted to determine a range of frequencies at which the acoustic feedback path will be probed.

23. The system of claim 17, wherein the system further includes:

a notch filter to filter the processed signal to provide a filtered signal, the notch filter responsive to a feedback parameter from the detector; and a combiner to combine the filtered signal and the probe signal to feed forward the narrowband subaudible probe signal to the output.

24. The system of claim 23, wherein the detector is configured to provide a plurality of feedback parameters, and the notch filter is responsive to the plurality of feedback parameters.

25. The system of claim 23, wherein the system further includes a delay coupled to the signal processor to provide the processed signal to the notch filter.

26. The system of claim 23, wherein the notch filter has a bandwidth, the notch filter configured to center its bandwidth on a bandwidth of the detected feedback component.

27. The system of claim 17, wherein the probe generator is configured to generate the probe signal with a bandwidth centered on a bandwidth of the feedback component in the input audio signal.

28. The system of claim 17, wherein the probe generator is configured to generate a plurality of signals that are combined to form a probe signal used to probe the acoustic feedback path.

29. The system of claim 17, wherein the system further includes a filter adjuster responsive to the detector to adjust the inhibiting filter.

30. The system of claim 29, wherein the filter adjuster is configured to compare the input audio signal and an output signal delayed from the output to determine amplitude and phase responses of the acoustic feedback path at a selected probe frequency.

31. The system of claim 29, wherein the filter adjuster is configured to provide the inhibiting filter with a set of filter coefficients from the filter adjuster.

32. The system of claim 29, wherein the filter adjuster includes a modeler receptive to the narrowband subaudible probe signal from the output, a feedback indicator parameter, and the input audio signal to model a response of the acoustic feedback path when the acoustic feedback path is probed with the acoustic subaudible probe signal at a predetermined frequency.

33. The system of claim 17, the processed signal includes an environmental context of a listener.

34. A system for enhancing audio signals comprising:

a signal processor for processing an input audio signal to provide a processed signal, the input audio signal having a feedback component, the feedback component associated with an acoustic feedback path;

a detector to detect the feedback component in the input audio signal;

a probe generator to generate a probe signal using the processed signal and a signal provided by the detector in response to the detector detecting the feedback component;

an inhibiting filter to inhibit the feedback component in the input audio signal; and an output to output a narrowband subaudible probe signal formed from the probe signal fed forward from the probe generator, the narrowband subaudible probe signal used to probe the acoustic feedback path with an acoustic subaudible probe signal, wherein the probe generator includes:

an input to receive a feedback indicator parameter from the detector;

an amplitude indicator to indicate an amplitude level of the probe signal, wherein the amplitude indicator provides an amplitude signal;

a frequency indicator to indicate a frequency of the probe signal, wherein the frequency indicator provides a frequency signal; and a signal generator receptive to the amplitude signal and the frequency signal to generate the probe signal.

35. The system of claim 34, wherein the amplitude indicator includes:

a bandpass filter receptive to the processed signal to provide a filtered signal;

a full-wave rectifier receptive to the filtered signal to provide a rectified signal; and a multiplier receptive to the rectified signal and an empirical constant to provide the amplitude signal.

36. The system of claim 35, wherein the bandpass filter has a bandpass about 150 Hertz wide.

37. The system of claim 35, wherein the amplitude signal is about 0 to about −3 dB relative to a level of the filtered signal of the bandpass filter.

38. The system of claim 35, wherein the empirical constant ranges from about 0.71 to about 1.0.

39. The system of claim 35, wherein the bandpass filter is configured with a predetermined response to attenuate an amplitude level of the probe signal.

40. The system of claim 34, wherein the frequency indicator includes:

a first divider to divide the feedback indicator parameter by two to provide a first divided signal;

an arccosine function to take the arccosine of the first divided signal to provide an arccosine signal;

a multiplier receptive to the arccosine signal and a system sampling rate to provide a multiplied signal; and a second divider to divide the multiplied signal by 2 times pi to provide the frequency signal.

41. The system of claim 34, wherein the frequency signal is a constant value.

42. The system of claim 34, wherein the signal generator is a sinusoidal generator.

43. The system of claim 34, wherein the signal generator is a narrowband noise generator.

44. A system for enhancing audio signals comprising:

a signal processor for processing an input audio signal to provide a processed signal, the input audio signal having a feedback component, the feedback component associated with an acoustic feedback path;

a detector to detect the feedback component in the input audio signal;

a probe generator to generate a probe signal using the processed signal and a signal provided by the detector in response to the detector detecting the feedback component;

an inhibiting filter to inhibit the feedback component in the input audio signal; and an output to output a narrowband subaudible probe signal formed from the probe signal fed forward from the probe generator, the narrowband subaudible probe signal used to probe the acoustic feedback path with an acoustic subaudible probe signal, wherein the system further includes a filter adjuster responsive to the detector to adjust the inhibiting filter, wherein the filter adjuster is configured to provide the inhibiting filter with a set of discrete-Fourier-transformed filter coefficients.

45. A system for enhancing audio signals comprising:

a signal processor for processing an input audio signal to provide a processed signal, the input audio signal having a feedback component, the feedback component associated with an acoustic feedback path;

a detector to detect the feedback component in the input audio signal;

a probe generator to generate a probe signal using the processed signal and a signal provided by the detector in response to the detector detecting the feedback component;

an inhibiting filter to inhibit the feedback component in the input audio signal; and an output to output a narrowband subaudible probe signal formed from the probe signal fed forward from the probe generator, the narrowband subaudible probe signal used to probe the acoustic feedback path with an acoustic subaudible probe signal, wherein the system further includes a filter adjuster responsive to the detector to adjust the inhibiting filter, wherein the filter adjuster includes a modeler receptive to the narrowband subaudible probe signal from the output, a feedback indicator parameter, and the input audio signal to model a response of the acoustic feedback path when the acoustic feedback path is probed with the acoustic subaudible probe signal at a predetermined frequency, wherein the modeler includes:

a first Goertzel transformer receptive to the feedback indicator parameter and the input audio signal to provide a first complex signal having a first phase and a first amplitude; and a second Goertzel transformer receptive to the feedback indicator parameter and the narrowband subaudible probe signal to provide a second complex signal having a second phase and a second amplitude.

46. The system of claim 45, wherein the modeler further includes:

a combiner to subtract the first phase and the second phase to provide a difference signal; and a divider to divide the first amplitude and the second amplitude to provide a ratio signal.

47. The system of claim 46, wherein the difference signal and the ratio signal form a sample representing the response of the acoustic feedback path to the acoustic subaudible probe signal.

48. The system of claim 47, wherein the sample is averaged.

49. The system of claim 48, wherein the filter adjuster further includes a discrete-Fourier-transformer to transform the sample to obtain a filter coefficient.

* * * * *

UNITED STATES PATENT AND TRADEMARK OFFICE

CERTIFICATE OF CORRECTION

PATENT NO. : 7,162,044 B2
APPLICATION NO. : 10/731915
DATED : January 9, 2007
INVENTOR(S) : Woods It is certified that error appears in the above-identified patent and that said Letters Patent is hereby corrected as shown below:

In column 11, line 24, in Claim 4, delete “farther” and insert -- further --, therefor.

Signed and Sealed this

Fifteenth Day of April, 2008

JON W. DUDAS
*Director of the United States Patent and Trademark Office*